United States Patent Office 2,998,968
Patented Sept. 5, 1961

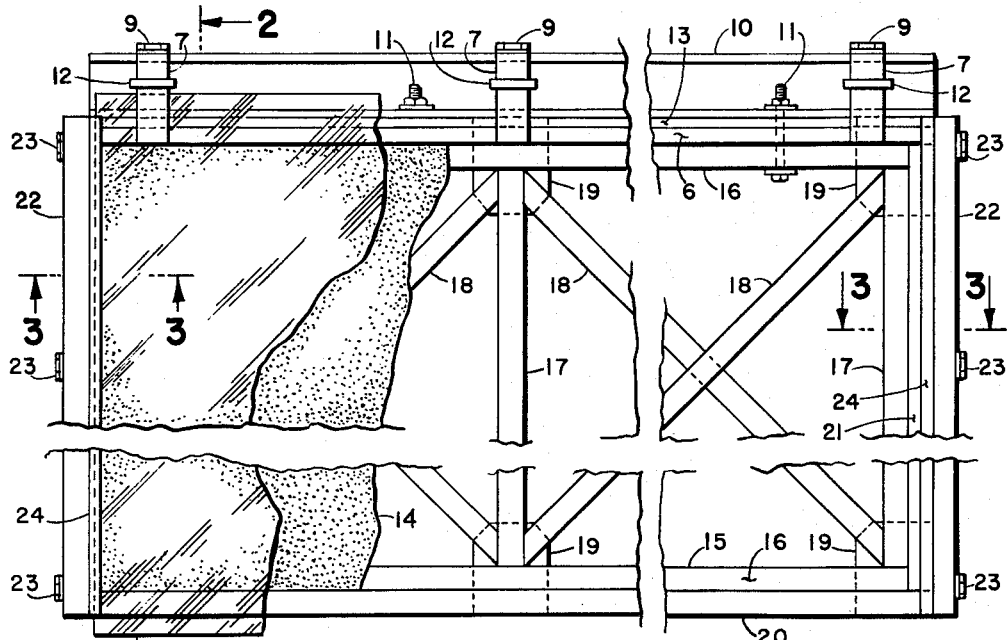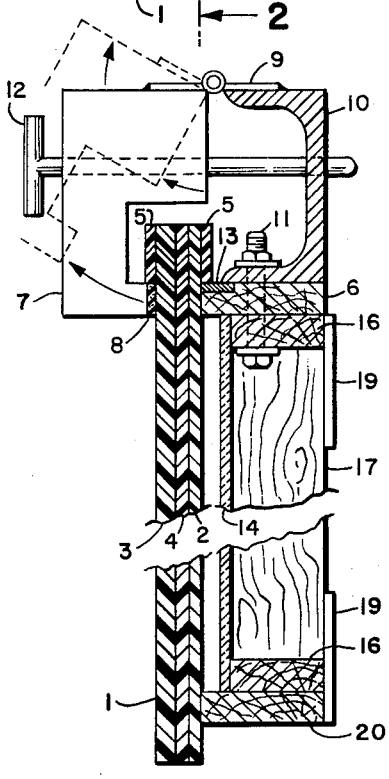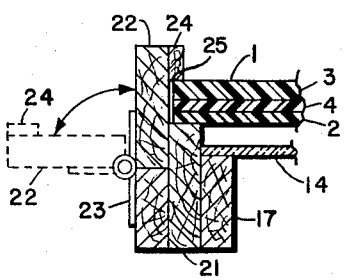

2,998,968
HEAT SHIELDING APPARATUS
Richard S. Hassard, Cuyahoga Falls, Ohio, assignor to Goodyear Aircraft Corporation, Akron, Ohio, a corporation of Delaware
Filed July 25, 1957, Ser. No. 674,245
2 Claims. (Cl. 263—50)

This invention relates to an apparatus for heat shielding and more particularly to an apparatus for shielding and equalizing the heat transfer to the face sheets of unbalanced laminates.

Unbalanced laminates are sandwiched constructions having, for example, two face sheets of plastic having different respective thicknesses separated by an intermediate layer. The intermediate layer may function as a shatterproof medium of more flexible character than the face sheets, such as polyvinyl butyral. A frequent problem arises on heating such laminates preparatory to the forming or shaping operation in that the inner layer generally has a time-temperature characteristic lower than that of the bounding sheets. By time-temperature characteristic is meant the rise in temperature over a time interval. Such rise in temperature per unit time is generally a limiting criterion for heating the inner layer.

The general object of this invention is to provide an apparatus for achieving uniform heating of the outer face sheets of an unbalanced laminate, while simultaneously limiting the time-temperature characteristic to a desirable value to prevent overheating of the inner layer.

A further object of this invention is to provide an apparatus for holding a flat sandwich of unbalanced laminate in such a manner that uniform heating of both face sheets may be accomplished without the outer surfaces of the laminate contacting any solid object or material during the heating cycle, thereby eliminating "mark-off" or damage to the polished sheet surfaces.

Yet another object of the invention is to provide an apparatus for clamping an unbalanced laminate in position and still permit normal expansion of the laminate and rapid removal of the sheet at the completion of the heating cycle.

Other objects and advantages of this invention will become apparent hereinafter as the description proceeds; the novel features, arrangements, and combinations being clearly delineated in the specification, as well as in the claims thereunto appended.

In the drawings:

FIG. 1 is front elevation of the shielding frame of the invention with a portion of the insulating shield and the laminate sheet cut away to show frame structure;

FIG. 2 is a vertical sectional view through the shielding frame and the laminate along line 2—2 of FIG. 1; and FIG. 3 is a fragmentary horizontal sectional view through the side members of the shielding frame along line 3—3 of FIG. 1 with the hinged edge panel shown in both open and closed position.

With specific reference to the form of the invention illustrated in the drawings, in FIG. 2 the numeral 1 generally designates a sandwich of unbalanced laminate which consists of a thin outer face sheet 2 of plastic material, a thick outer face sheet 3 of plastic material, and an inner shatterproof sheet 4 of more flexible plastic material such as polyvinyl butyrate. A clincher strip 5 of material similar to that of the adjacent face sheet is cemented to the outer face sheets 2 and 3 along the top edges thereof to facilitate clamping along the top edge of the laminate 1.

As shown in FIGS. 1 and 2, the laminate 1 is suspended vertically between a top spacer strip 6 and a plurality of U-shaped clamps 7, each clamp having at its contacting area a resilient pad 8 of sponge rubber or similar material. Each of the clamps 7 is connected by a hinge 9 to a channel beam 10 contiguous to the top spacer strip 6 and fastened thereto by a plurality of bolts 11. The clamps 7 are each held in clamping position by a removable pin or draw bolt 12 extending through each clamp 7 and through the channel 10. A metal strip 13 is attached longitudinally to the upper face of the spacer strip 6 to extend under the clincher strip 5 to assist in supporting the laminate 1. The metal strip 13 also aids in heat transfer to the clincher strip 5 and the portion of thin face sheet 2 which is in contact with the clincher strip 5. Due to the additional thickness of the upper edge of the laminate due to the placement of the clincher strips 5 and their shielded position, additional heat transfer is required to bring them up to the required time temperature characteristic simultaneously with the remainder of the laminate 1.

A thermal barrier sheet 14 of a heat insulating material is attached to a rectangular frame 15. The frame 15 consists of horizontal braces 16, vertical braces 17, diagonal braces 18, and joint reinforcing plates 19. The upper spacer strip 6 is attached to top of the horizontal brace strip 16 and the lower spacer strip 20 is attached to bottom of the horizontal brace strip 16. Side spacer strips 21 are provided and are attached to the side vertical braces 17. The top spacer strip 6, the bottom spacer strip 20, and the side spacer strips 21 maintain a predetermined dead air space between the laminate 1 and the thermal barrier sheet 14.

To each side spacer strip 21 is attached an edge panel 22 by hinges 23 and a cleat strip 24 which loosely engages over the laminate along the side edges of the thick face sheet 3.

The edge panels 22 prevent the passage of heat between the laminate 1 and the thermal barrier sheet 14 and thereby provide a more accurate control of the temperature of the thin face sheet 2 and inner sheet 4.

As can now be understood from the above arrangement, the thermal resistivity of the sheet 3 is greater than that of sheet 2 of FIG. 2 in that although the thermal conductivity of the two sheets is the same if they are of the same material, the thickness of one sheet is more than of the other. If the sandwich 1 were simply placed into a heated chamber, there would exist a temperature gradient through the sandwich at any particular instantaneous time-temperature point such that the face of the inner sheet 4 contacting the outer sheet 2 would be at a higher temperature than the face of the inner sheet 4 contacting the outer sheet 3.

To compensate for this heat transfer unbalance, added thermal resistances in the form of the thermal barrier sheet 14 and the space between it and the sandwich 1 are provided as shown. The individual thermal resistivities of the barrier sheet, the dead air space, and the outer sheet 2 are of course additive as they are in series. The sum total of the thermal resistances of these is predetermined to be such as to be equal numerically to the thermal resistivity of the outer sheet 3. Thus, insofar as the inner sheet 4 is concerned, the thermal resistances on each side of it are equal. The net result is that in the time-temperature cycle of heating, at any instantaneous time, the temperature of the face of the inner sheet 4 contacting the outer sheet 2 is equal in magnitude to the temperature of the face of the inner sheet 4 contacting the outer sheet 3 and therefore unbalanced heating of the inner sheet 4 is avoided.

In the actual use of the apparatus of the invention, the laminate 1 is placed within the frame, the edge panel 22 closed as shown in FIG. 3, and the clamps 7 locked as shown in FIG. 2. The shielding frame with the laminate suspended vertically thereon is then placed in a preheating oven to warm the laminate prior to forming. The thermal barrier sheet 14 retards heat transfer the oven's interior to the thin face sheet 2 and the inner sheet 4, thereby causing the thin face sheet 2, the thick face sheet 3 and the inner sheet 4 to reach the desired time-temperature characteristic simultaneously. Damage to the inner sheet 4 which occurs when heating of sheet 2 and 4 is accomplished before heating of thicker sheet 3 is completed is thus prevented.

The vertically suspended laminate is free to expand during the heating cycle without wrinkling or binding against the frame or without the central portions of the outer face surfaces of the laminate contacting frame or the thermal barrier and thereby causing mark-off or damage. In effect the laminate 1 is loosely held by the resilient pad 8 and an expansion space 25 (FIG. 3) is provided on each vertical edge of the laminate 1. Further expansion is permitted by allowing the edge panel 22 to swing outwardly for a short distance and yet prevent passage of heat into the dead air space.

The spacer strips 6, 20 and 21 maintain a desired predetermined distance between the laminate 1 and the thermal barrier sheet 14, and the hinged edge panels 22 prevent heat passage from the side edges of the laminate into the dead air gap between the laminate 1 and the thermal barrier sheet 14.

When the heating of the laminate is completed the shielding frame and laminate is removed from the oven, the pins 12 pulled from the clamps 7, the clamps 7 opened, and the laminate 1 is removed ready for the forming operation.

Thus it can be seen that the objects of the invention are achieved by the apparatus of the invention whereby external thermal resistances are balanced to provide a time-temperature characteristic desirable for preheating a laminated sandwish which of itself poses an unbalanced resistance to heat transfer. It will be obvious that although one thermal barrier sheet 14 is shown in the drawings, a plurality of thermal barrier sheets could be used where necessary to provide the proper thermal resistance.

While certain representative embodiments and details have been shown for the purpose of illustrating the invention, it will be apparent to those skilled in this art that various changes and modifications may be made therein without departing from the spirit or the scope of the invention.

What is claimed:

1. A heat shielding frame for supporting an unbalanced laminate sandwich of plastic sheets during a heating operation preparatory to a forming operation, said frame comprising a multiplicity of frame members each comprising a brace strip and a spacer strip adjustably mounted thereon, said members being arranged in end to end relation to define an enclosed area adapted to have substantially the size and shape of a sandwich, said frame members having sandwich-engaging margins in a single plane for engaging a face of a sandwich, clamping means along one of said frame members for clamping one margin of a sandwich thereto, a retaining and heat barrier strip hingedly secured along each of the adjoining frame members and adapted to be engageable over margins of a sandwich, said retaining members being arranged to retain but not to clamp the remaining margins so as to permit expansion and contraction of a sandwich, a heat barrier supported by said frame in uniformly spaced relation to the sandwich-engaging margins of the frame members, said heat barrier and said frame members together defining a closed dead air space adapted to retard heat transfer to an adjacent face layer of a sandwich.

2. A portable, self-contained, heat-shielding frame for supporting an unbalanced laminate sandwich of plastic sheets having an extra lamination at one end, and movable into an oven for a heating operation, said frame comprising a multiplicity of frame members arranged to define and fully enclose a sandwich receiving opening adapted to be of the shape of and slightly smaller than a sandwich, said frame members each having a sandwich engaging margin in a single plane for endlessly and laterally abutting against one flat face of a sandwich near the peripheral margins of the sandwich, at least one heat barrier sheet of insulating material mounted in said frame members across said opening in spaced relation to said single plane and adapted to define a substantially dead air space between said heat barrier and a face of a sandwich at said plane, means for securing a sandwich from its said end adjacent said extra lamination and for holding it against said margin of said frame, metal means carried by said frame members at said sandwich engaging margin to concentrate the heat supply at said extra lamination, and releasable edging means for retaining the edges of a sandwich extending from said end against the margin of the frame.

References Cited in the file of this patent

UNITED STATES PATENTS

| | | |
|---|---|---|
| 559,083 | Pierce | Apr. 28, 1896 |
| 1,872,482 | Messing | Aug. 16, 1932 |
| 1,985,520 | Schafer | Dec. 25, 1934 |
| 2,016,568 | Zinser | Oct. 8, 1935 |
| 2,288,524 | Hall | June 30, 1942 |
| 2,444,420 | Borkland | July 6, 1948 |
| 2,578,209 | Schwarz | Dec. 11, 1951 |
| 2,595,905 | Telkes | May 6, 1952 |